(12) United States Patent
Sauer et al.

(10) Patent No.: US 7,398,997 B2
(45) Date of Patent: Jul. 15, 2008

(54) STEERING WHEEL ARRANGEMENT FOR MOTOR VEHICLES

(75) Inventors: Frank Sauer, Niedernberg (DE); Oliver Bauer, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 21 days.

(21) Appl. No.: 11/065,797

(22) Filed: Feb. 25, 2005

(65) Prior Publication Data
US 2005/0236826 A1   Oct. 27, 2005

(30) Foreign Application Priority Data
Feb. 27, 2004   (DE) .................. 20 2004 003 406 U

(51) Int. Cl.
*B62D 1/011* (2006.01)
(52) U.S. Cl. ............................ 280/777; 74/552; 74/557
(58) Field of Classification Search ................ 280/777; 74/552, 557; 188/371
See application file for complete search history.

(56) References Cited

U.S. PATENT DOCUMENTS

| | | | |
|---|---|---|---|
| 3,456,526 A * | 7/1969 | Brilmyer ..................... | 74/552 |
| 3,540,304 A * | 11/1970 | Weiss .......................... | 74/492 |
| 4,200,309 A | 4/1980 | Korn et al. | |
| 4,353,266 A | 10/1982 | Grothe | |
| 4,946,194 A * | 8/1990 | Maeda et al. ................ | 280/777 |
| 5,005,863 A | 4/1991 | Drefahl | |
| 5,070,742 A * | 12/1991 | Sakane et al. ................. | 74/552 |
| 5,490,435 A * | 2/1996 | Famili ......................... | 74/552 |
| 6,418,814 B1 * | 7/2002 | Emeneth et al. ............... | 74/552 |

FOREIGN PATENT DOCUMENTS

| | | |
|---|---|---|
| CN | 2 171 534 Y | 7/1994 |
| DE | 0027294 A1 * | 4/1981 |
| DE | 37 02 847 | 8/1987 |
| DE | 38 38 594 | 5/1990 |
| DE | 39 21 333 A1 | 1/1991 |
| DE | 44 06 420 A1 | 9/1995 |
| DE | 197 47 873 A1 | 4/1999 |
| DE | 102 08 706 A1 | 9/2003 |
| JP | 54 97932 | 7/1979 |
| JP | 04 62273 | 5/1992 |

OTHER PUBLICATIONS

An Office Action dated Jan. 12, 2007, from the Patent Office of the People's Republic China.
English language translation of an Office Action dated Jul. 17, 2007, from the Japanese Patent Office in corresponding Japanese Application No. JP2005-89767.
A search report dated Mar. 12, 2008, from the European Patent Office in corresponding European Application No. 050900430-2425.

* cited by examiner

*Primary Examiner*—Ruth Ilan
*Assistant Examiner*—Timothy Wilhelm
(74) *Attorney, Agent, or Firm*—Fitch, Even, Tabin & Flannery

(57) ABSTRACT

The invention relates to a steering wheel arrangement for motor vehicles, in which the risk of injury is reduced, should a driver impact against the steering wheel in the event of a crash. According to the invention the skeleton of the steering wheel arrangement has a compact body of deformable, energy absorbing material, in which the spokes of the steering wheel are fixed.

6 Claims, 5 Drawing Sheets

STEERING WHEEL ARRANGEMENT FOR MOTOR VEHICLES

FIELD OF THE INVENTION

The invention relates to a steering wheel arrangement.

BACKGROUND OF THE INVENTION

Steering wheel arrangements for motor vehicles are known, in which the risk of injury is reduced, should the driver, in the event of a crash, impact against the steering wheel whilst the airbag is not yet deployed. DE 44 06 420 A1, for example, discloses a steering wheel in which the steering wheel spokes, which join the hub and the steering wheel rim, are capable of bending should a driver impact against the steering wheel rim. In this case the steering wheel rim is capable of bending downwards from a normal plane relative to the hub into a deflection plane. This is achieved in that the padding material enclosing each steering wheel spoke running behind the central axis of the hub renders said spoke less flexurally rigid than does the padding material of each steering wheel spoke running in front of the central axis of the hub. This reduces the risk of injury to the impacting driver.

The disadvantage of this steering wheel lies in the increased cost, since spokes of different flexural rigidity have to be produced.

DE 197 47 873 A1 discloses an energy absorbing steering wheel which comprises an upper part containing the steering wheel rim and spokes, and a lower part which contains the hub, the lower part being designed as an energy absorbing deformable component. In order to achieve the energy absorption, the lower part has a shape such that sections thereof are capable of deformation. The lower part can therefore have a spoke-like structure, it being possible to influence the desired energy absorption through the number, shape and arrangement of the spokes.

This arrangement has the disadvantage that besides the spokes in the upper part, additional spokes are provided in the lower part, which make the steering wheel more costly.

SUMMARY OF THE INVENTION

The object of the invention is to reduce the manufacturing cost of an energy absorbing steering wheel.

According to the invention this is achieved by the features described herein.

In a steering wheel arrangement for motor vehicles in which the risk of injury is reduced, should a driver impact against the steering wheel in the event of a crash, the skeleton of the steering wheel arrangement according to the invention has a compact body of deformable, energy absorbing material, in which the spokes of the steering wheel are fixed. This arrangement has the advantage that such a body of deformable material is substantially more cost effective to manufacture than the arrangements described in the state of the art. Furthermore, such a body is deformable in any direction and can thus be deformed by a translational or rotational movement. Different deformations are possible, depending on the speed of the vehicle on impact, the position of the driver at the time of impact and the stature of the driver, that is to say whether he is large, small, heavy or light.

At least one spoke has a spoke head, which is embedded in the body of energy absorbing material. Such a spoke head ensures that the spoke is held firmly in the body.

The spoke head is preferably of a flat construction and has at least one rib. Two intersecting ribs are preferably provided on each of the opposite flat sides of the spoke head. Such a flat spoke head in conjunction with at least one rib ensures that the spoke is held firmly in the body. In a further development the spoke head is rounded at its end and the ribs are likewise rounded and at their ends have at least virtually the thickness as the spoke head.

Metallic foam or rigid plastic foam is preferably provided as energy absorbing material for the body.

The thickness of the body is preferably a multiple of the thickness of the spokes so that, in the event of any deformation of the body in a crash, although the spoke shifts its position it does not break out of the body.

BRIEF DESCRIPTION OF THE DRAWINGS

The invention will now be explained in one exemplary embodiment with reference to the drawings, in which.

DETAILED DESCRIPTION OF THE PREFERRED EMBODIMENTS

Figure 1:
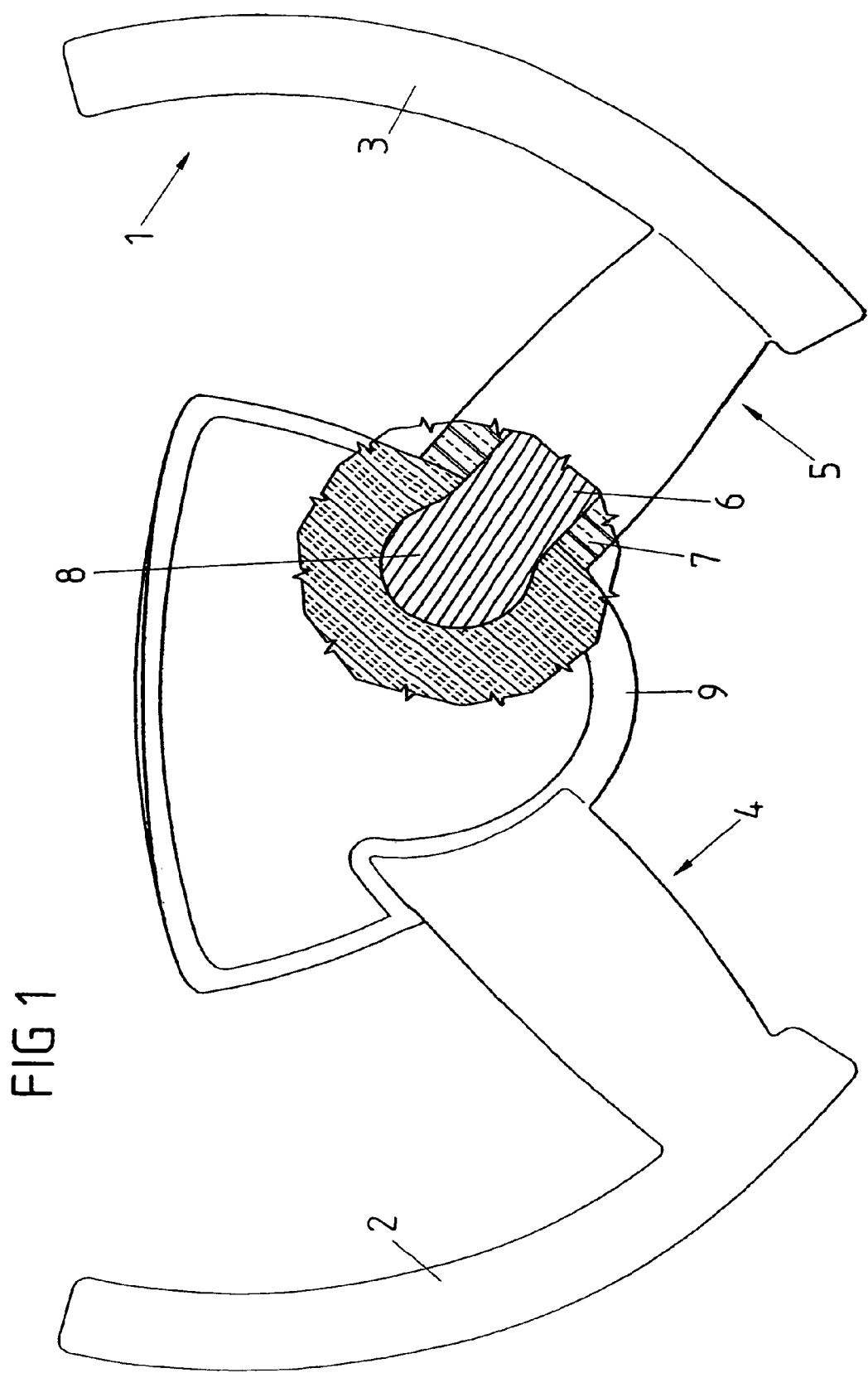
FIG. 1 shows a top, partially sectional view of a new type of steering wheel, in which the steering wheel rim is open at the top.

FIG. 1 represents a new type of steering wheel 1, in which a divided steering wheel, open at the top, is provided with two steering wheel rim sections 2, 3. This steering wheel has two spokes 4, 5, which both have a spoke skeleton 6 and a foam cladding 7. The spoke skeleton 6 is shown only in section on the spoke 5. The spoke skeleton 6 terminates in a flat spoke head 8. This spoke head serves for fixing the spokes 4, 5 in a body 9, which is composed of a deformable, energy absorbing material. In this exemplary embodiment an airbag unit is provided in the body 9. However, a deformable body may also be arranged in a steering wheel without airbag unit.

Figure 2:
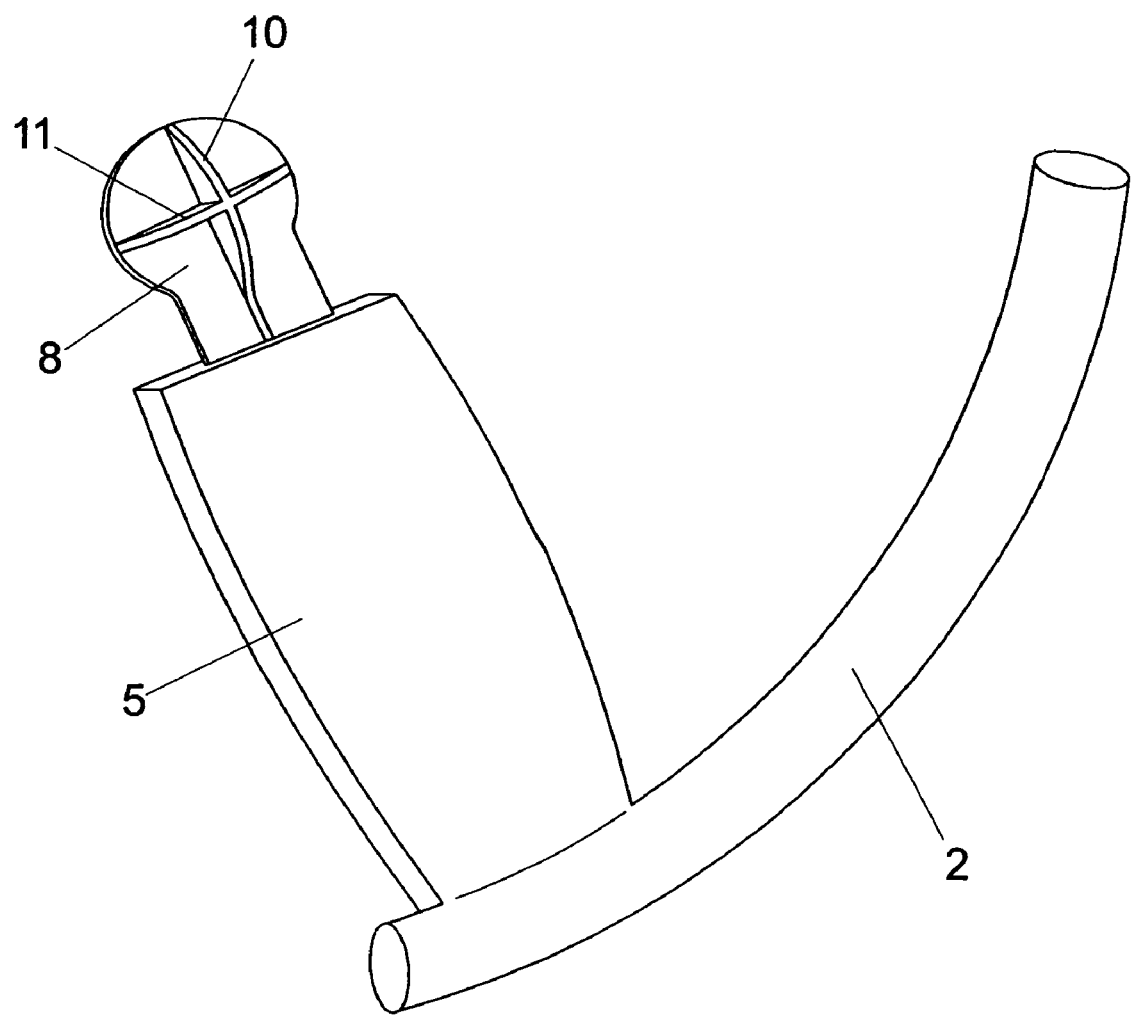
FIG. 2 shows a steering wheel section having a spoke with spoke head.

FIG. 2 shows the shape of the spoke head 8 in more detail. It will be seen that the spoke head is of flat construction and that it has two intersecting ribs 10, 11, which are highest in the area of intersection and run out to the thickness of the flat spoke head towards the edge of the spoke head. These ribs ensure that the spoke head is firmly anchored in the body 9. Intersecting ribs may likewise be arranged on the rear side of the flat spoke head.

Figure 3:
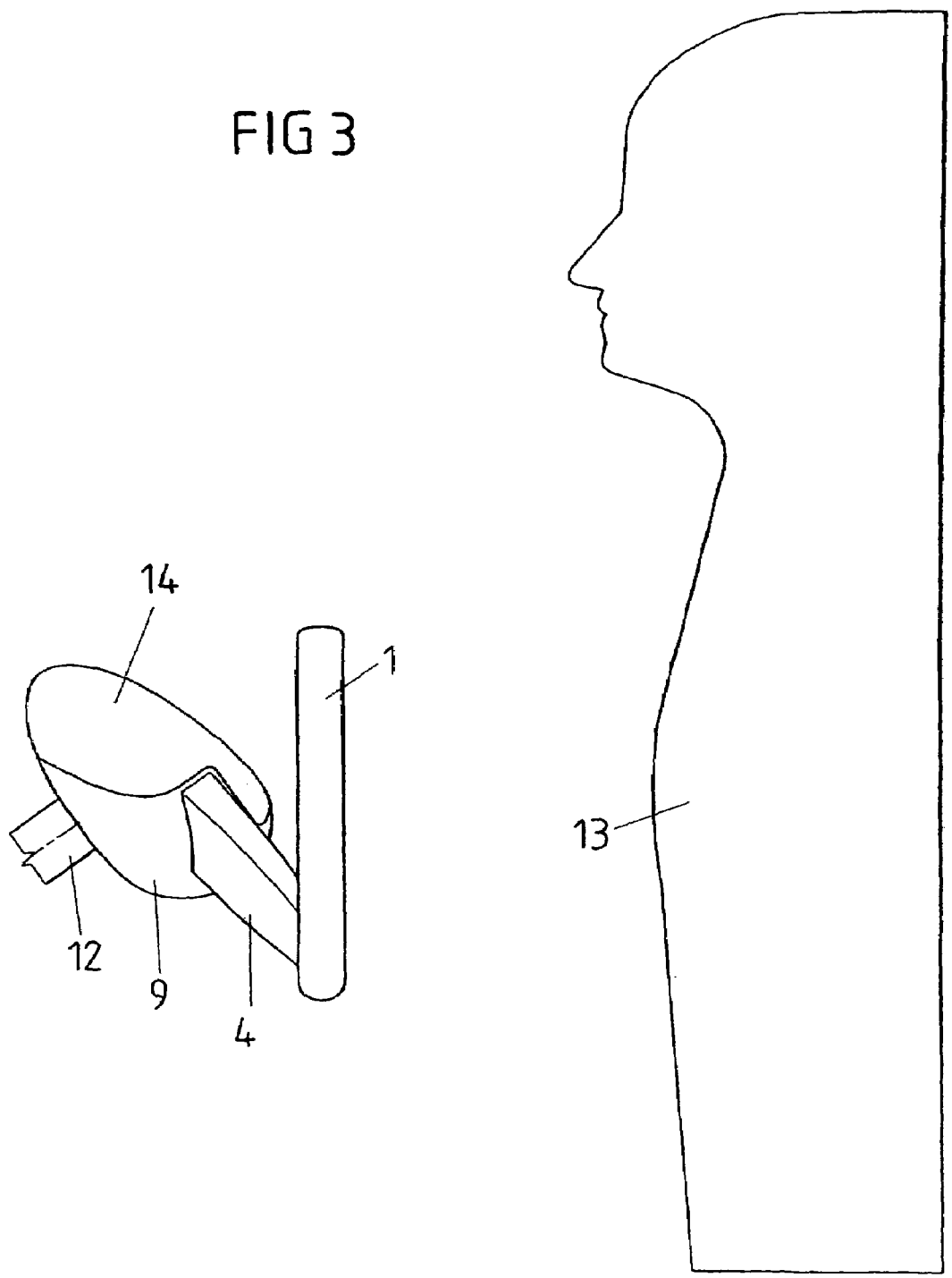
FIG. 3 shows a side view of the steering wheel and an occupant in the normal position.
Figure 4:
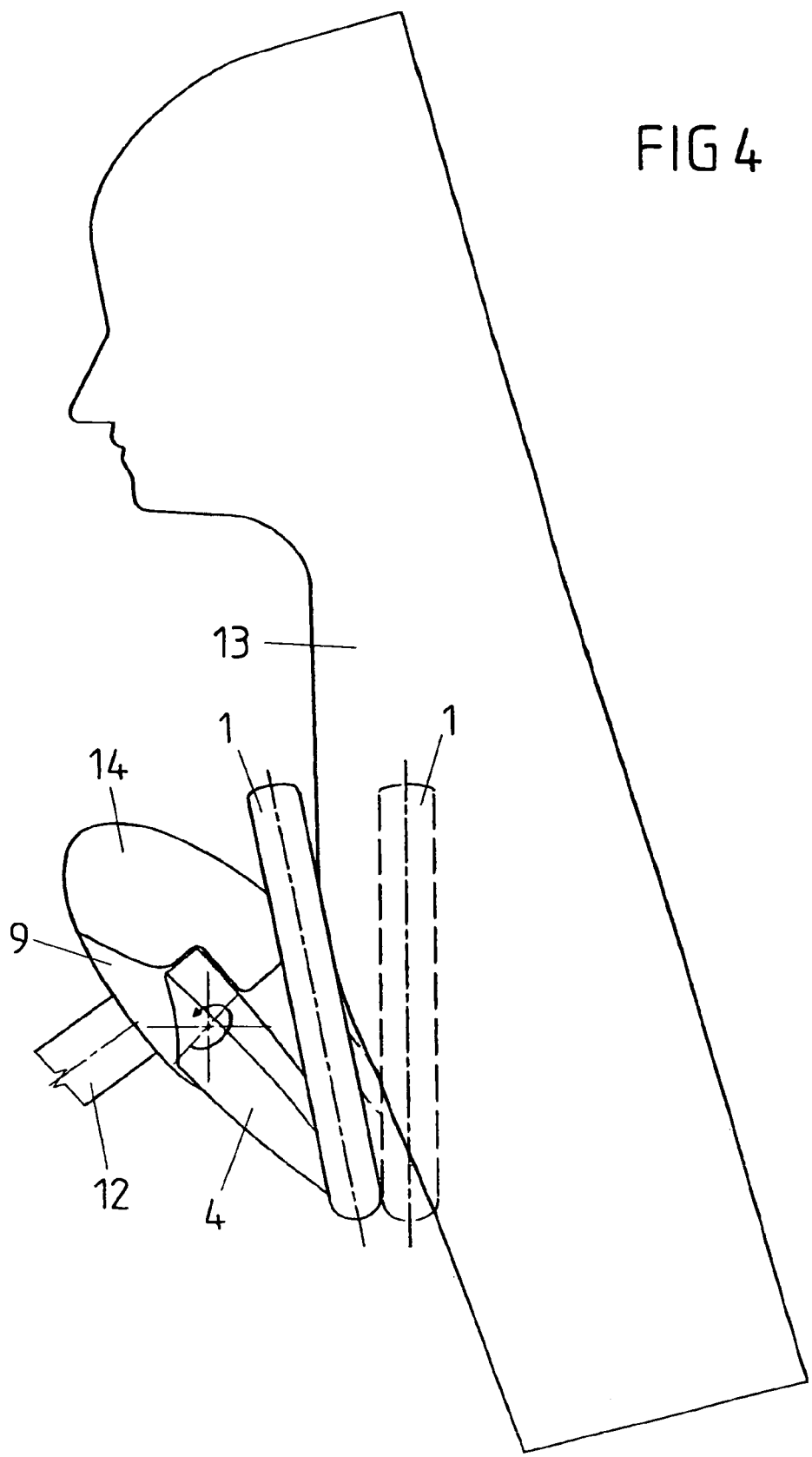
FIG. 4 shows a side view of the steering wheel and an occupant in the event of a crash.

FIG. 3 shows the normal position of the steering wheel 1, fixed to a steering column 12, and of the occupant 13. Should the occupant press against the steering wheel in the event of a crash with the airbag of an airbag unit 14 not opened, as is represented in FIG. 4, the spokes 4, 5 in the body 9 are turned in the direction of the arrow, the body 9 being deformed. Only the spoke 4 is represented in FIG. 4. As can be seen from the enlargement in FIG. 5, the spoke 4 is simultaneously displaced in the body 9. The same applies to the spoke 5 (not shown). The representation of the steering wheel 1 and the spoke 4 indicated by dashed lines shows the original position of the steering wheel, whilst the representation indicated by solid lines shows the position of the steering wheel 1 and the spoke 4 after the occupant has impacted against the steering wheel 1.

Figure 5:
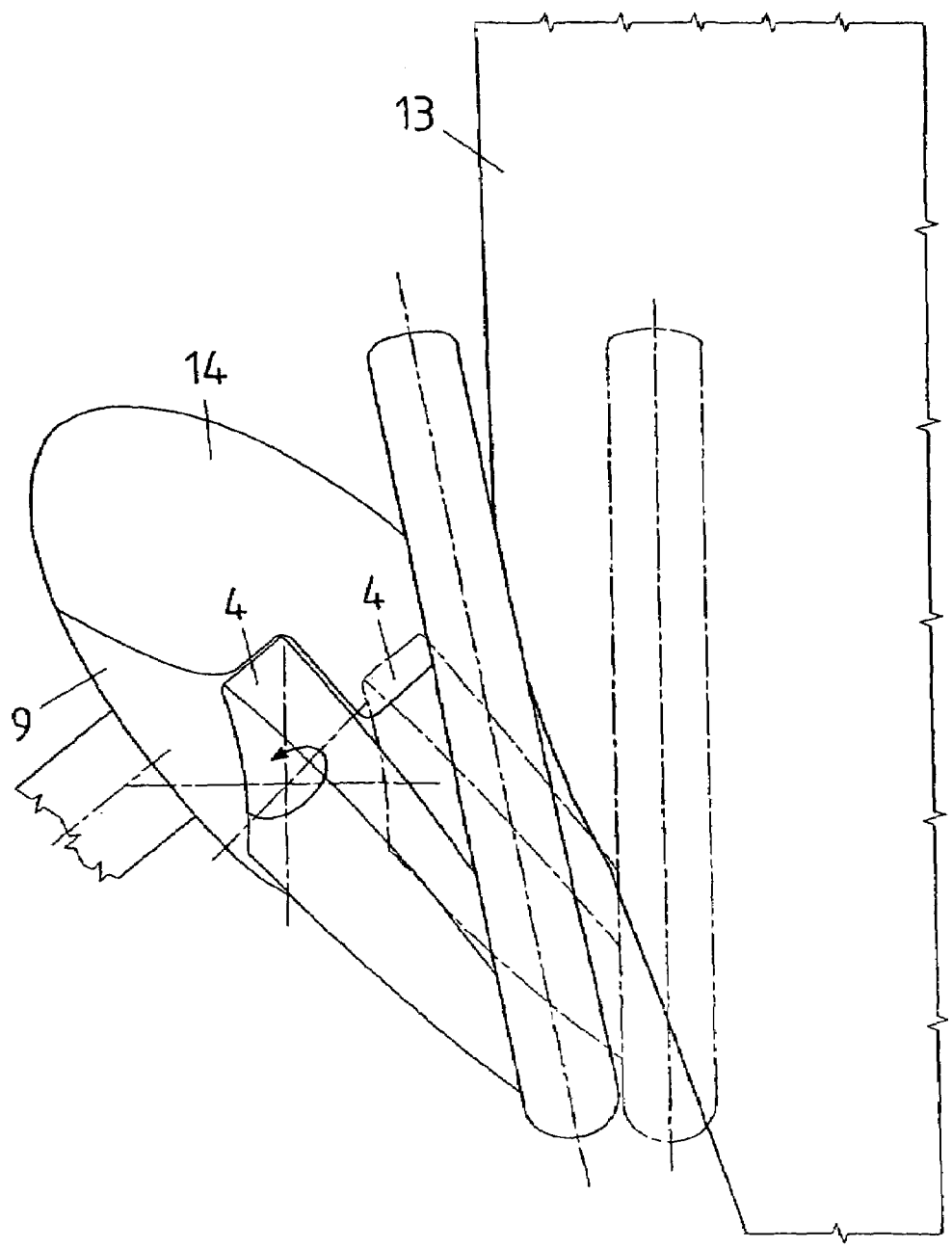
FIG. 5 shows an enlarged representation of the steering wheel according to FIG. 4.

The deformations represented in FIGS. 4 and 5 are only examples of the many different deformations possible with the arrangement according to the invention.

What is claimed is:

1. A steering wheel arrangement for motor vehicles, in which the risk of injury is reduced, should a driver impact against a steering wheel in the event of a crash, the steering wheel arrangement comprising
    a skeleton of the steering wheel;
    spokes of the steering wheel skeleton;
    a compact body of deformable, energy absorbing material, in which the spokes of the steering wheel are fixed,
    wherein at least one spoke has a spoke head, which is embedded in the body of energy absorbing material, is of flat construction, and two intersecting ribs are provided on each of opposite flat sides of the spoke head.

2. A steering wheel arrangement for motor vehicles, in which the risk of injury is reduced, should a driver impact against a steering wheel in the event of a crash, the steering wheel arrangement comprising:
    a skeleton of the steering wheel;
    spokes of the steering wheel skeleton;
    a compact body of deformable, energy absorbing material, in which the spokes of the steering wheel are fixed
    wherein at least one spoke has a spoke head, which is embedded in the body of energy absorbing material, is of flat construction, has at least one rib, and the spoke head is rounded at its end and the at least one rib is likewise rounded and at an end thereof has at least virtually the thickness of the spoke head.

3. The steering wheel arrangement as claimed in claim 1 or 2, wherein metallic foam or rigid plastic foam is used as energy absorbing material.

4. The steering wheel arrangement as claimed in claim 1 or 2, wherein the body and the spokes have respective thicknesses, and the thickness of the body is a multiple of the thickness of the spokes.

5. The steering wheel arrangement as claimed in claim 1 or 2, wherein the spokes each have opposite ends and a spoke head at one of the ends, and
    a hub in which the compact body of deformable, energy absorbing material is disposed with the spoke heads embedded therein.

6. The steering wheel arrangement as claimed in claim 1 or 2, wherein the steering wheel spokes have greater resistance to deformation than the body of energy absorbing material.

* * * * *

UNITED STATES PATENT AND TRADEMARK OFFICE
CERTIFICATE OF CORRECTION

PATENT NO. : 7,398,997 B2  
APPLICATION NO. : 11/065797  
DATED : July 15, 2008  
INVENTOR(S) : Frank Sauer et al.

It is certified that error appears in the above-identified patent and that said Letters Patent is hereby corrected as shown below:

Title Page, (56) References Cited, Other Publications, line 7, delete "050900430-2425" and insert -- 05090043.0-2425 -- therefor.

Column 3, line 8, after "comprising" insert -- : --.

Column 3, line 24, after "fixed" insert -- ; --.

Signed and Sealed this

Fourteenth Day of October, 2008

JON W. DUDAS  
*Director of the United States Patent and Trademark Office*